(12) United States Patent
Berfner

(10) Patent No.: US 9,579,611 B2
(45) Date of Patent: Feb. 28, 2017

(54) AERATOR ASSEMBLY FOR DIFFUSING A GAS IN A LIQUID

(71) Applicant: XYLEM IP MANAGEMENT S.àr.l., Senningerberg (LU)

(72) Inventor: Anders Berfner, Sundbyberg (SE)

(73) Assignee: XYLEM IP MANAGEMENT S.à r.l., Senningerberg (LU)

( * ) Notice: Subject to any disclaimer, the term of this patent is extended or adjusted under 35 U.S.C. 154(b) by 0 days.

(21) Appl. No.: 14/777,833

(22) PCT Filed: Mar. 5, 2014

(86) PCT No.: PCT/IB2014/059448
§ 371 (c)(1),
(2) Date: Sep. 17, 2015

(87) PCT Pub. No.: WO2014/147506
PCT Pub. Date: Sep. 25, 2014

(65) Prior Publication Data
US 2016/0279582 A1    Sep. 29, 2016

(30) Foreign Application Priority Data
Mar. 18, 2013  (SE) ...................... 1350322

(51) Int. Cl.
*B01F 3/04* (2006.01)
*C02F 3/20* (2006.01)

(52) U.S. Cl.
CPC ......... *B01F 3/0412* (2013.01); *B01F 3/04269* (2013.01); *B01F 2003/0417* (2013.01); *C02F 3/201* (2013.01)

(58) Field of Classification Search
CPC . B01F 3/0412; B01F 3/04241; B01F 3/04269; B01F 2003/0417; B01F 2003/04276; C02F 3/201; F16L 19/00; F16L 41/08
(Continued)

(56) References Cited

U.S. PATENT DOCUMENTS 587,546  A    8/1897  Dillenburg
5,075,048  A  *  12/1991  Veeder ................. B01F 3/0412
                                                     261/122.1
(Continued)

FOREIGN PATENT DOCUMENTS

DE    4421211    1/1996
DE    19546675   6/1997
(Continued)

OTHER PUBLICATIONS

Corrected International Preliminary Report on Patentability for International Application No. PCT/IB2014/059448 mailed Oct. 6, 2015.
(Continued)

*Primary Examiner* — Charles Bushey
(74) *Attorney, Agent, or Firm* — RatnerPrestia

(57) ABSTRACT

An aerator assembly for diffusing a gas in a liquid, including a gas supply conduit and at least one aerator, wherein the gas supply conduit and the aerator are releasably joined to each other by an attachment. The attachment includes a flexible body and a compressor, wherein the attachment is arranged to be reversibly set in an inactive mode, in which the gas supply conduit and the at least one aerator are in mutually released mode, as well as in an active mode in which the flexible body is compressed in its axial longitudinal direction by the compressor and clamps the at least one aerator and the gas supply conduit against each other.

6 Claims, 5 Drawing Sheets

Figure 1:
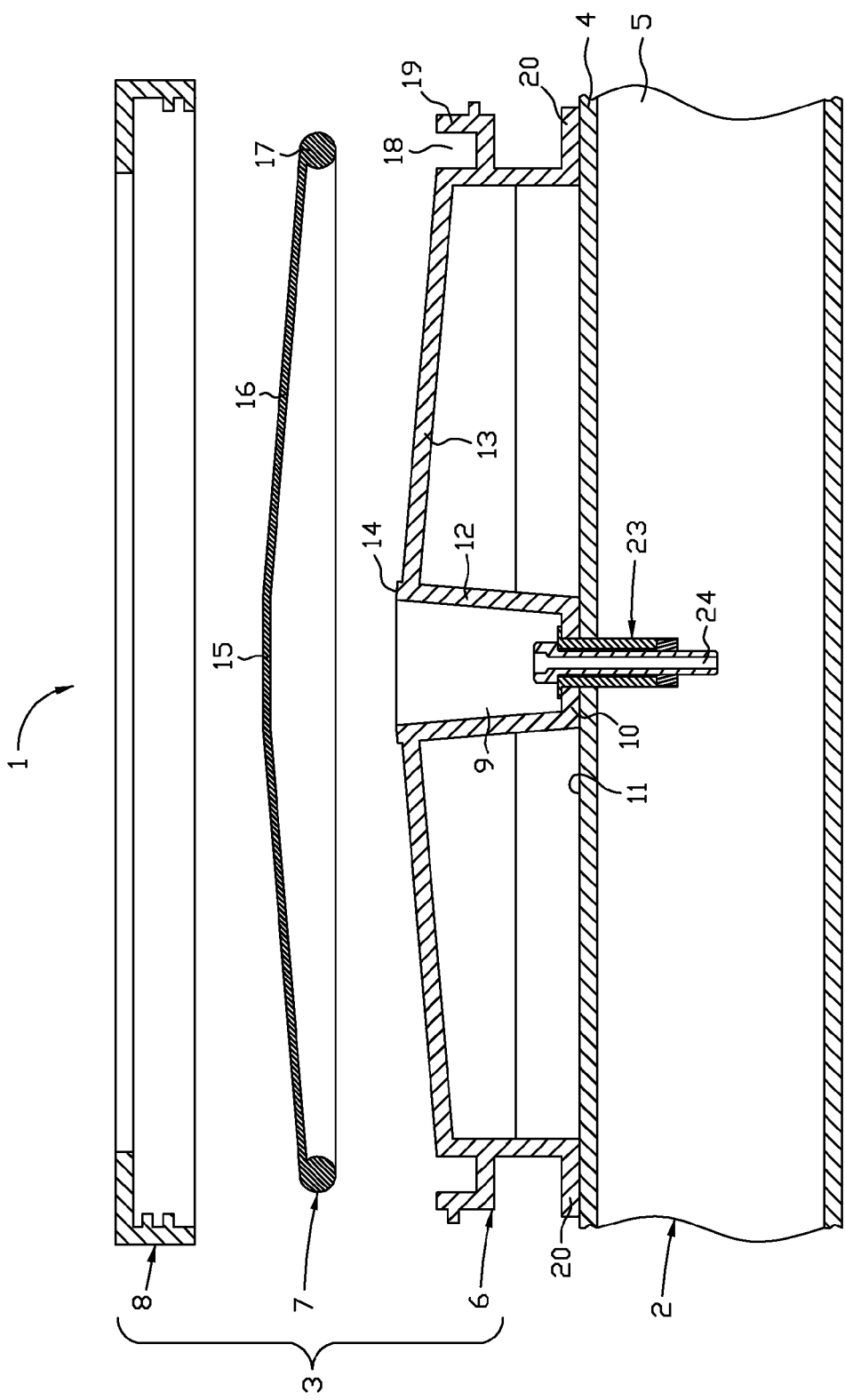

(58) Field of Classification Search
USPC .................. 261/121.1, 122.1, 122.2, 124
See application file for complete search history.

(56) References Cited

U.S. PATENT DOCUMENTS

| | | | | |
|---|---|---|---|---|
| 5,676,890 | A | * | 10/1997 | Ott ..................... B01F 3/0412 261/122.2 |
| 5,762,835 | A | * | 6/1998 | Bassfeld ............ B01F 3/04269 261/122.1 |
| 5,810,400 | A | | 9/1998 | Youngs |
| 6,464,211 | B1 | | 10/2002 | Downs |
| 8,833,743 | B2 | * | 9/2014 | Ko ..................... B01F 3/04262 261/121.1 |
| 2006/0226260 | A1 | | 10/2006 | Jager |
| 2012/0086137 | A1 | * | 4/2012 | Ryu ................... B01F 3/04262 261/122.1 |

FOREIGN PATENT DOCUMENTS

| | | |
|---|---|---|
| DE | 102004063770 | 9/2006 |
| EP | 0229387 | 7/1987 |

OTHER PUBLICATIONS

International Preliminary Report on Patentability for International Application No. PCT/IB2014/059448 mailed Jun. 11, 2015.
International Search Report for International Application No. PCT/IB2014/059448 mailed Jun. 12, 2014.
Written Opinion of the International Preliminary Examining Authority mailed Feb. 27, 2015 for International Application No. PCT/IB2014/059448.
Written Opinion of the International Searching Authority for International Application No. PCT/IB2014/059448 mailed Jun. 12, 2014.

* cited by examiner

AERATOR ASSEMBLY FOR DIFFUSING A GAS IN A LIQUID

CROSS-REFERENCE TO RELATED APPLICATIONS

This patent application is a U.S. National Phase Patent Application of PCT Application No. PCT/IB2014/059448, filed Mar. 5, 2014, which claims priority to Swedish Patent Application No. 1350322-2, filed Mar. 18, 2013, each of which is incorporated by reference herein in its entirety.

TECHNICAL FIELD OF THE PRESENT INVENTION

The present invention relates generally to devices for supplying gas to a liquid, for instance aeration of waste water during waste water treatment. Such devices are known for instance referred to as aerators, diffusers. In such applications pressurised gas, such as air or other oxygen-containing gas is pressed through perforations in a membrane of the aerator while fine bubbling aeration of the liquid is provided. In particular, the present invention is related to an aerator assembly for diffusing a gas in a liquid, comprising a gas supply conduit and at least one aerator, wherein the gas supply conduit comprises a pipe wall limiting an inner gas supply chamber and said at least one aerator comprises a holder having an inner space. The gas supply conduit and the aerator are releasably joined to each other by means of an attachment means extending from the inner chamber of the holder to said gas supply chamber and comprising a duct for fluid communication between the inner chamber of the holder and the gas supply chamber.

BACKGROUND TO THE INVENTION AND PRIOR ART

There are a number of known measures to attach single aerators on a gas supply conduit, but most of known solutions comprise complicated attachment such as a threaded pipe connection piece welded onto the gas supply conduit, pipe clamps complicating and raising the price of the holder and the system of the aerator, etc.

Another known measure to attach an aerator to a gas supply conduit is to glue the holder of the aerator to the pipe wall of the gas supply conduit by means of an adhesive. A disadvantage with these glue joints is that they are hard and brittle and if the aerator is subject to high forces, for instance during installation of the aerator assembly in a basin, the glue joint will be damaged and if the aerator completely or partly loosens it is difficult to reattach the aerator to the gas supply conduit. The difficulty lies in that gluing is suitable for factory gluing, i.e. for obtaining an optimal glue joint, controlled environment and suitable fixtures are required. However, normally neither of these is available during installation of the aerator assembly in a basin of a customer. Moreover, gluing is a more or less permanent joint, rendering it more difficult to exchange or add more aerators to the aerator assembly.

In U.S. Pat. No. 6,464,211 an untapped, alternatively a threaded pop rivet is used for joining the gas supply conduit and the aerator. In other words, a pop rivet extends from the inner chamber of the holder to the gas supply chamber, such that gas or air is allowed to flow through the pop rivet. However, there is a great risk that problems arise due to leakage at the interface, and therefore a number of seals are provided in the interface between the aerator and the pipe wall of the gas supply conduit. For detaching the aerator to exchange the same the pop rivet must be destroyed, for instance by drilling the same. However, there is a risk that the gas supply conduit and/or the aerator are damaged during such a measure. If the stiff pop rivet is partly deformed due to external forces on the aerator during installation of the aerator assembly in a basin, there is a substantial risk that the same will leak despite the seal at the interface between the aerator and the gas supply conduit.

OBJECTS OF THE INVENTION

The present invention aims at obviating the aforementioned disadvantages and failings of prior known aerator assemblies and to provide an improved aerator assembly. A primary object of the present invention is to provide an improved aerator assembly of the initially defined type, which is robust to external forces and does not risk loosening or leaking even if the aerator is subject to external forces during installation of the aerator assembly.

Another object of the present invention is to provide an aerator assembly, wherein each aerator is easy to remove, and to exchange on site in the basin, independent of material or thickness of the pipe wall of the gas supply conduit.

Another object of the present invention is to provide an aerator assembly, which provides simple attachment of further aerators to the gas supply conduit on site in the basin, so-called expansion or capacity increase.

Another object of the present invention is to provide an aerator assembly, wherein no additional seal is required to prevent leakage.

Another object of the present invention is to provide an aerator assembly, wherein one and the same attachment means can be used to attach an aerator on gas supply conduits having pipe walls of different thicknesses.

Another object of the present invention is to provide an aerator assembly, which is simple and non-expensive.

SUMMARY OF THE FEATURES OF THE INVENTION

According to the invention at least the primary object is achieved by means of the initially defined aerator assembly, having the features defined in the independent claim. Preferred embodiments of the present invention are further defined in the dependent claims.

According to the present invention, there is provided an aerator assembly of the type defined above, which is characterised in that the attachment means of the aerator assembly comprises a flexible body and a compression means, wherein the attachment means is arranged to be reversibly set in an inactive mode in which the gas supply conduit and said at least one aerator are in a mutually released mode, as well as in an active mode in which the flexible body is compressed by means of the compression means and clamps said at least one aerator and the gas supply conduit against each other.

According to a preferred embodiment of the present invention, the flexible body is tubular, and according to another more preferred embodiment, the compression means of the attachment means comprises a screw and a nut, which are in engagement with each other.

According to another preferred embodiment, the screw of the compressions means comprises the duct of the attachment means.

Further advantages of the features of the invention will be apparent in the other independent claims and the following detailed description of preferred embodiments.

BRIEF DESCRIPTION OF DRAWING FIGURES

Figure 2:
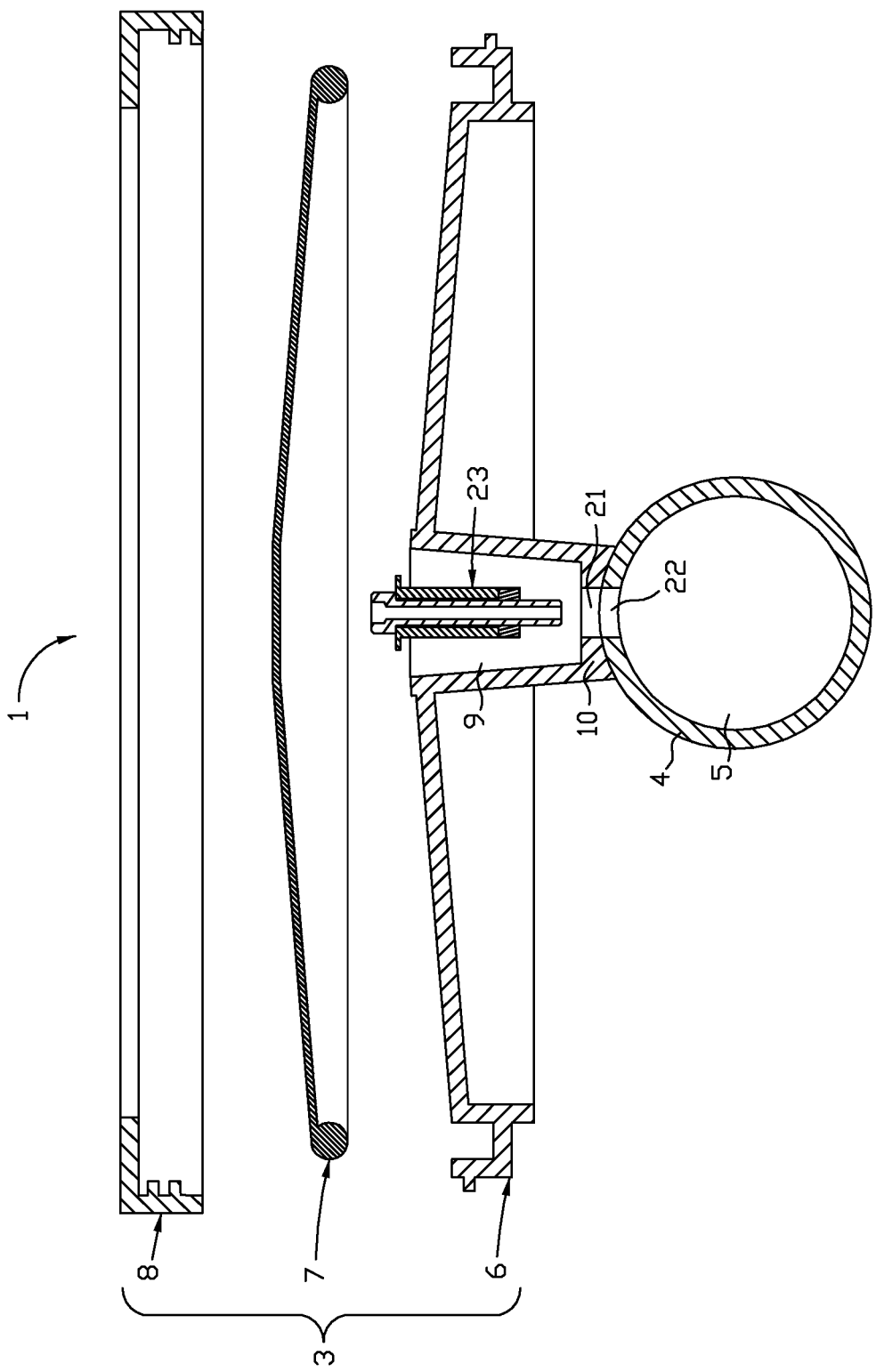
Figure 3:
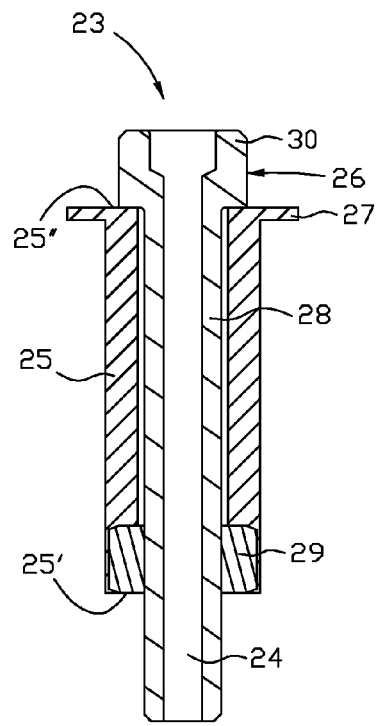
Figure 4:
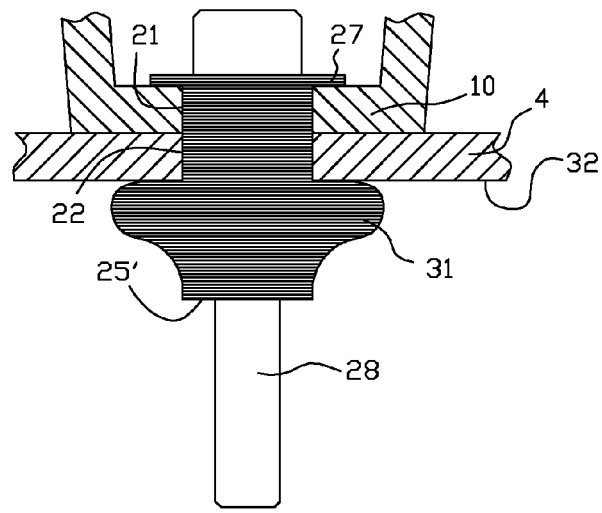
Figure 5:
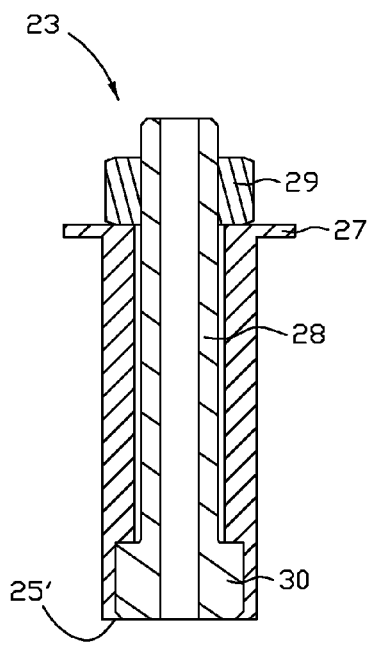
Figure 6:
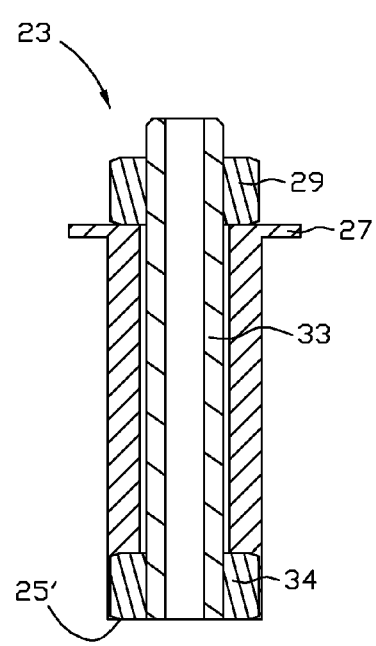
Figure 7:
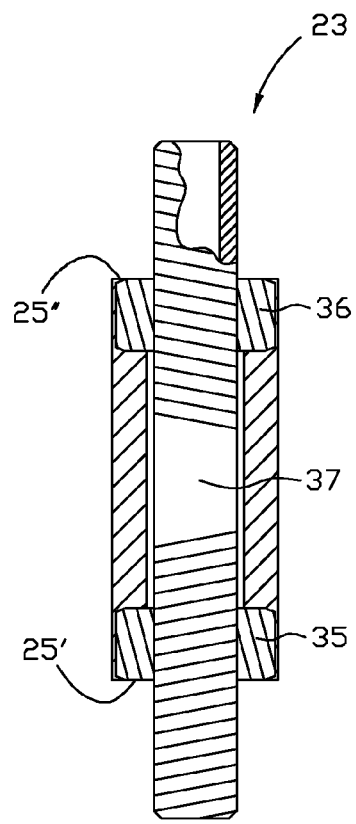
Figure 8:
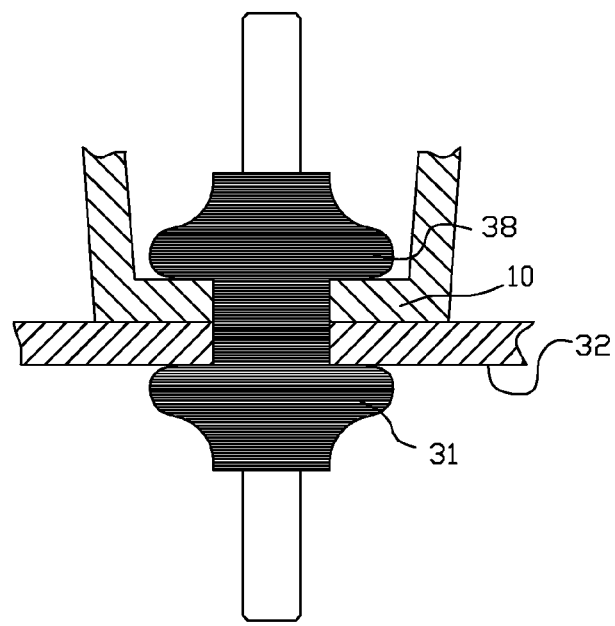
Figure 9:
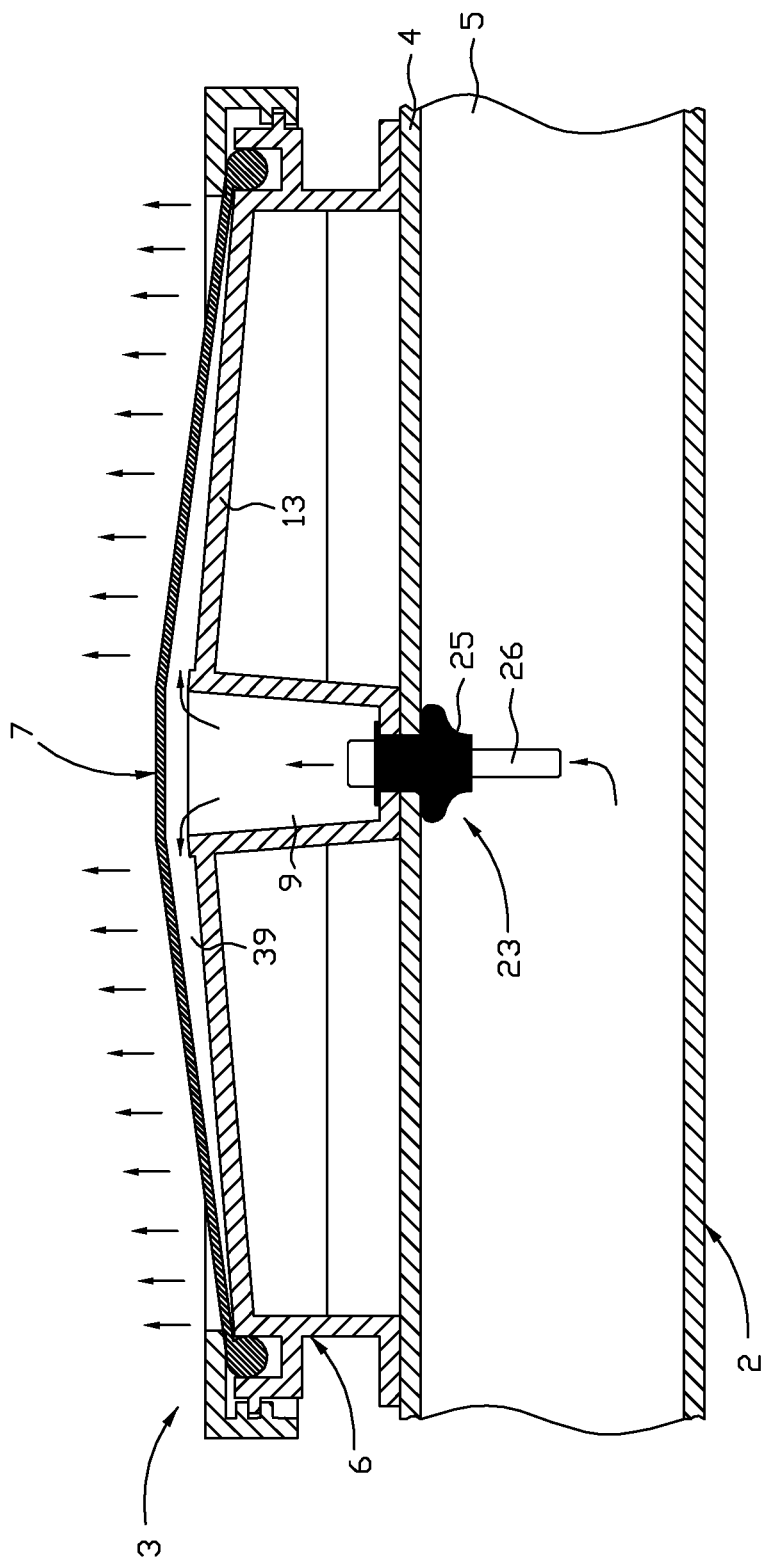

A more thorough understanding of the above disclosed and other features and advantages of the present invention will be apparent from the following, detailed description of preferred embodiments and with reference to the accompanying drawings, in which:

FIG. 1 is a schematic exploded sectional view from the side of an aerator according to the present invention, seen in a radial direction, FIG. 2 is a schematic exploded sectional view from the side of the aerator assembly of FIG. 1, seen in axial direction, FIG. 3 is a schematic exploded sectional side-view of an attachment means according to a first embodiment, in inactive mode, FIG. 4 is a schematic exploded sectional side-view of the attachment means according to FIG. 3, in active mode, FIG. 5 is a schematic sectional side-view of an attachment means according to a second embodiment, in inactive mode, FIG. 6 is a schematic sectional side-view of an attachment means according to a third embodiment, in inactive mode, FIG. 7 is a schematic sectional side-view of an attachment means according to a fourth embodiment, in inactive mode, FIG. 8 is a schematic sectional side-view of the attachment means according to FIG. 7, in active mode, and FIG. 9 is a schematic sectional side-view corresponding to the aerator assembly of FIG. 1 in mounted position and during operation.

DETAILED DESCRIPTION OF PREFERRED EMBODIMENTS

The present invention relates generally to devices for supplying gas to a liquid, for instance aeration of waste water during waste water treatment.

Reference is initially made to FIGS. 1 and 2, which illustrate a preferred embodiment of an aerator assembly, generally designated 1, according to the invention. The aerator assembly 1 comprises a gas supply conduit, generally designated 2, extending axially and at least one aerator, generally designated 3. The aerator 3 can for instance be embodied as a plate aerator or a panel aerator. In practice, the aerator assembly 1 comprises a plurality of aerators 3 arranged side by side to each other along one and the same gas supply conduit 2. The aerator assembly 1 is adapted to be installed in a basin (not illustrated), or similar reservoir for containing liquid, and during operation, the gas supply conduit 2 is by means of a suitable piping installation joined to a blowing machine, compressor or similar machine, which provides pressurised gas to the aerator assembly 1. The pressurised gas can be air, oxygen or any other oxygen-containing gas, acid-containing gas for instance for cleaning the aerator 3 or other process gas, etc. The gas supply conduit 2 comprises a pipe wall 4 delimiting an inner gas supply chamber 5, and the gas supply conduit 2 thus operates like a branch-pipe, wherein pressurised gas is distributed to the aerators 3 which are joined to the gas supply conduit 2.

The aerator 3 in the illustrated embodiment comprises a holder 6, a membrane 7 and a locking ring 8, wherein the holder 6 is arranged to receive the membrane 7 and the locking ring 8 is arranged to retain the membrane 7. In the embodiment illustrated, the holder 6 has a circular basic form, seen from above, however the holder can have other forms such as rectangular.

The holder 6 comprises an inner space 9, and in the embodiment illustrated, the holder 6 comprises a saddle 10, which rests against the envelope surface 11 of the pipe wall 4 of the gas supply conduit 2, and which preferably is positioned centrally. From the saddle 10 a pipe fitting 12 extends in radial direction in relation to the gas supply conduit, and the inner space 9 of the holder 6 is partly delimited by said saddle 10 and said pipe fitting 12. In vicinity to an upper end of the pipe fitting 12 there is a disc-shaped membrane supporting flange 13 connected to the pipe fitting 12. In the embodiment illustrated the membrane supporting flange 13 has a form of a truncated cone. In vicinity to the interface between the pipe fitting 12 and the membrane supporting flange 13, the holder 6 preferably comprises a radially extending, circumferential ridge 14 surrounding the upper opening to the inner space 9 of the holder 6.

The membrane 7 of the embodiment illustrated comprises a central part 15 which is unperforated, a perforated part 16 which surrounds the central part 15 and has a large number of perforations, and an outer frame 17. The membrane 7 is adapted to be supported by the membrane supporting flange 13, when the aerator assembly 1 is not in operation. In particular, the unperforated central part 15 of the membrane 7 rests against the circumferential ridge 14 of the holder 6 to act as a non-return valve preventing process fluid to enter the gas supply chamber 5, when the aerator assembly 1 is not in operation. The central part 15 of the membrane 7 also contributes to delimit the inner space 9 of the holder 6. In the vicinity to an outer edge of the membrane supporting flange 13, the holder 6 comprises a seat 18 for the frame 17 of the membrane 7, and an externally threaded border 19. The locking ring 8 comprises an internal thread adapted to engage with the externally threaded border 19 of the holder 6, wherein the locking ring 8 clamps the frame 7 of the membrane 7 in the seat 18 of the holder 6.

In addition to the saddle 10, the holder 6 in the embodiment illustrated, also comprises two supporting legs 20 resting against the envelope surface 11 of the gas supply conduit 2, which supporting legs 20 are arranged in the outer edge of the membrane supporting flange 13 and are arranged diametrically opposite to each other to be able to rest against the envelope surface 11 of the axially extending gas supply conduit 2.

The saddle 10 has a through-hole 21, and the pipe wall 4 of the gas supply conduit 2 has a corresponding through-hole 22, wherein said two holes are placed in overlapping configuration in releasable mounting of the aerator 3 to the gas supply conduit 2, wherein the inner space 9 of the holder will be arranged in fluid communication with the gas supply chamber 5. It shall be pointed out that said two holes may have mutually different size, but preferably they are of equal size.

The aerator assembly 1 comprises an attachment means, generally designated 23, which in mounted position extends from the inner space 9 of the holder 6 to the gas supply chamber 5 and which comprises a duct 24 for fluid communication between the inner space 9 and the gas supply chamber 5. The attachment means 23 is arranged to be reversibly set in an inactive mode in which the gas supply conduit 2 and the aerator 3 are in mutually released mode (see FIG. 3), as well as in an active mode in which the aerator 3 and the gas supply conduit 2 are joined to each other (see FIG. 4). Note that the aerator assembly 1 may also comprise a plurality of such attachment means 23 that join one and the same aerator 3 to the gas supply conduit 2, which is particularly useful when the aerator 3 is a panel aerator.

Reference is now primarily made to FIGS. 3 and 4, which illustrate an attachment means 23 according to a first embodiment. The attachment means 23 comprises a flexible body 25 and a compression means, generally designated 26. The compression means 26 is arranged to, when the attachment means 23 is in said active mode, compress the flexible body 25 in its axial longitudinal direction, wherein the flexible body 24 then clamps the aerator 3 and the gas supply conduit 2 against each other. Since the flexible body 25 is flexible, the attachment means 23 can easily be set from the inactive mode to the active mode, and back to the inactive mode, solely by manipulation of the compression means 26. Since the flexible body 23 is compressed in its axial longitudinal direction, the flexible body 23 expands in radial direction.

According to a preferred embodiment, the flexible body 25 is elastic, and preferably it is made of an elastomer. This implies that the attachment means 23 alternately can be set in the active mode and in the inactive mode, respectively, a plurality of times without the attachment means 23 losing its functionality.

According to the preferred embodiment of the attachment means 23 illustrated in FIGS. 3 and 4, the flexible body 25 is tubular. The flexible body 25 comprises an axially extending shaft having a first, lower end 25' and a second upper end 25" opposite to the first end. In the area of the upper end 25", the flexible body 25 comprises a radially extending flange 27. The lower end 25' of the flexible body 25 is arranged to be guided through the through-hole 21 of the saddle 10 and the through-hole 22 of the pipe wall 4 of the gas supply conduit 2, while the radially extending flange 27 of the body 25 hinders the attachment means 23 from completely passing through said two holes.

According to the preferred embodiment, the compressions means 26 of the attachment means 23 comprises a screw 28 and a nut 29, which are in engagement with each other. Said nut 29 is joined to the tubular flexible body 25 at the area of the lower end 25' of the shaft. Said screw 28 extends from the upper end 25" of the tubular flexible body 25 to the lower end 25'. The screw 28 comprises a head 30 which, directly or indirectly via a washer, rests against the radially extending flange 27 of the flexible body 25. In the embodiment illustrated, the duct 24 of the attachment means 23 is arranged in the screw 28, wherein the duct 24 is concentric to the screw 28 and extends along the shaft of the screw 28. By selecting screws wherein the ducts 24 mutually have different throughput areas, the gas-flow to each aerator 3 can easily be adjusted. When manipulating the screw 28 in a first direction, the flexible body 25 is compressed in axial direction and the attachment means 23 will enter the active mode, and when manipulating the screw 28 in a second direction opposite to the first direction, the flexible body 23 returns to the non-compressed mode and the attachment means 23 enters the inactive mode. When compressing the flexible body 25 a blob 31 is formed on the shaft positioned between the lower end 25' of the shaft and an inner surface 32 of the pipe wall 4 of the gas supply conduit 2, wherein the blob 31 and the radially extending flange 27 clamps the aerator 3 and the gas supply conduit 2 against each other, and simultaneously seals against leakage in the interface between the aerator 3 and the gas supply conduit 2. Since the blob 31 rests against the inner surface 32 of the pipe wall 4 the degree of sealing will increase corresponding to higher pressure of the pressurised gas in the gas supply chamber.

In the following different alternative embodiments of the attachment means 23 will be described, wherein the same parts have the same reference numeral and only the features different from the first embodiment and the different embodiments will be explained.

Reference is now made to FIGS. 5 and 6, which illustrates a second and a third embodiment, respectively, of the attachment means 23.

In FIG. 5 the head 30 of the screw 28 is connected to the lower end 25' of the flexible body 25 and the screw 28 extends to and past the upper end 25" of the flexible body 25, wherein the nut 29, directly or indirectly via a washer, rests against the radially extending flange 27 of the flexible body 25. During manipulation of the nut 29, the attachment means 23 is set in the active and the inactive mode, respectively.

In the embodiment according to FIG. 6, the screw according to the first embodiment (FIG. 3) and the second embodiment (FIG. 5), respectively, is exchanged by an externally threaded pipe 33 and a second nut 34, which are in engagement with each other. The second nut 34 is joined to the lower end 25' of the flexible body 25 and the pipe 33 extends from the second nut 34 to and past the upper end 25" of the flexible body 25, such that the first nut 29 directly or indirectly via a washer, rests against the radially extending flange 27 of the flexible body 25. When manipulating the first nut 29, or when manipulating the first nut 29 and the pipe 33, the attachment means 23 is set in the active and the inactive mode, respectively.

Reference is now made to FIGS. 7 and 8, which illustrate a fourth embodiment of the attachment means 23, wherein FIG. 7 illustrates the attachment means 23 in inactive mode and FIG. 8 illustrates the attachment means 23 in active mode.

In this embodiment, the compression means 26 comprises a right-threaded nut 35, a left-threaded nut 36 and a double-threaded pipe 37 being in engagement with said two nuts. Thus, the double-threaded pipe 37 is right-threaded in a first end and left-threaded in the other end. The right-threaded nut 35 is joined to the lower end 25' of the flexible body 25 and the left-threaded nut 36 is joined to the upper end 25" of the flexible body 25. Thus, in this fourth embodiment, the attachment means 23 has a function corresponding to a traditional rigging screw. When manipulating the double-threaded pipe 37 to set the fastening means 23 in the active mode, a first blob 31 is formed resting against the inner surface 32 of the pipe wall 4 of the gas supply conduit 2, and a second blob 38 resting against the saddle 10, such that the aerator 3 and the gas supply conduit 2 are clamped against each other between said blobs.

Reference is now made to FIG. 9, in which the inventive aerator assembly 1 is illustrated in mounted condition and during operation. The membrane 7 and the flange 13 supporting the membrane together delimit a gas outlet chamber 39 being in fluid communication with the inner space 9 of the holder 6. Note that the inner space 9 of the holder 6 and the gas outlet chamber 39 can be provided as one and the same space. During operation of the aerator assembly 1 pressurised gas is flowing from the gas supply chamber 5, via the duct 24 in the attachment means 23 to the inner space 9 of the holder 6, and further to the gas outlet chamber 39 and then out via the perforations of the membrane 7 while forming small gas bubbles added to the liquid surrounding the aerator assembly 1.

Feasible Modifications of the Invention

The invention is by no means limited only to the embodiments described and the embodiments illustrated in the drawings, which are intended only for illustration and as examples. This patent application is intended to cover all adaptions and variants of the preferred embodiments described herein, and because of that, the present invention is defined by the wording of the accompanying claims and hence the equipment can be modified in any way within the scope of the accompanying claims.

Also note that all information to/regarding terms such as above, under, upper, lower, etc. is intended to be understood/read with the equipment oriented in accordance with the figures, with the drawings oriented such that the reference numerals can be read properly. Thus, such terms only indicates mutual relations in the embodiments illustrated, which relations can be altered if the inventive equipment is provided with another construction/design.

Note that even if not explicitly described, it shall be regarded as obvious that features from one specific embodiment can be combined with the features of another embodiment, whenever possible.

The invention claimed is:

1. An aerator assembly for diffusing a gas in a liquid comprising:
    a gas supply conduit and at least one aerator, the gas supply conduit comprising a pipe wall delimiting an inner gas supply chamber and said at least one aerator comprising a holder having an inner space,
    wherein the gas supply conduit and the aerator are releasably joined to each other by an attachment means extending from the inner space of the holder to said inner gas supply chamber and comprising a duct for fluid communication between the inner space of the holder and the gas supply chamber,
    wherein the attachment means comprises a flexible body and a compression means, the flexible body being tubular and having a first end and an opposite second end, and the compression means of the attachment means comprising a screw and a nut, which are in engagement with each other,
    wherein said nut is joined to the tubular flexible body at the area of the first end, and said screw extends from a second end of the tubular flexible body to said first end,
    wherein the attachment means is arranged to be reversibly set in an inactive mode, in which the gas supply conduit and said at least one aerator are in mutually released mode, as well as in an active mode in which the flexible body is compressed in its axial longitudinal direction by the compression means and clamps said at least one aerator and the gas supply conduit against each other.

2. The aerator assembly according to claim 1, wherein, the flexible body is elastic.

3. The aerator according to claim 1, wherein, the flexible body is made of an elastomer.

4. The aerator according to claim 1, wherein, the tubular flexible body, at the area of the second end, comprises a radially extending flange.

5. The aerator assembly according to claim 1, wherein, the screw of the compression means comprises said duct.

6. The aerator assembly according to claim 1, wherein, said at least one aerator comprises a perforated membrane, which partially delimits a gas outlet chamber being in fluid communication with the inner space of the holder.

* * * * *